United States Patent [19]

Trinity

[11] Patent Number: 4,689,018

[45] Date of Patent: Aug. 25, 1987

[54] METHOD OF MONITORING CREDIT CARD CHARGES

[76] Inventor: James R. Trinity, 1629 Grandview Ave., Glendale, Calif. 91201

[21] Appl. No.: 820,373

[22] Filed: Jan. 21, 1986

[51] Int. Cl.⁴ .............................................. G09B 19/00
[52] U.S. Cl. ................................. 434/109; 283/66 R; 283/904; 434/416
[58] Field of Search ............... 434/107, 109, 408, 416, 434/422; 283/1 R, 1 A, 66 R, 901, 904

[56] References Cited

U.S. PATENT DOCUMENTS 2,871,582  2/1959  Frank ................................... 434/416

Primary Examiner—William H. Grieb
Attorney, Agent, or Firm—Evanns & Walsh

[57] ABSTRACT

A method for monitoring an individual credit card account particularly during a predetermined monitoring period. The steps of the method include the steps of setting up a form, preferably on a piece of erasable material of wallet card size. A series of numerals is provided on the card adapted to accommodate the step of being checked so as to identify a particular amount owing on the account. A series of individual purchase amounts is identified with a series or group of spaces opposite to, or related to, each monetary amount for the step of entry of indicia identifying a purchase of that amount or approximately that amount. A masking member is provided to accommodate the step of covering the spaces associated with one or more of the monetary purchase amounts to remind and warn the user of his intent not to make purchases in those amounts in order to remain within a predetermined budget. Further groups or series of spaces is provided for the step of entering indications of amounts of payments made during the monitoring period and the total of the balance owing at any particular time or, on the other hand, the remaining balance of the user's credit limit that has not been obligated.

6 Claims, 2 Drawing Figures

METHOD OF MONITORING CREDIT CARD CHARGES

BACKGROUND OF THE INVENTION

1. Field of the Invention

The field of the invention is primarily that of monitoring a continuing monetary record. More particularly, the invention is concerned with monitoring, that is, more specifically, providing for maintaining current information as to accrued charges that have been made on a credit card account and the balance of the user's credit limit that is still available for use on the credit card.

2. Description of the Prior Art

Credit cards and their uses are, of course, well known in the art. The basic credit card operation is quite simple. The credit card user can make purchases and merely present his credit card to the vendor who makes a record of the purchase which is submitted to the originator of the credit card, for example, a bank, and then the credit card holder is billed periodically, for example, every month. Typically, a credit card holder has an authorized credit limit, that is, a designated amount of credit, that he can obligate during a predetermined period, such as perhaps $3,000 a month or less.

A need has developed in connection with the use of credit cards as follows. The credit card holder has no means of knowing how much of his credit he has obligated or used at a particular time during the billing period, typically one month without consulting records that may be available. Not knowing this at any given time, of course, he does not know how much of his credit limit remains unobligated, that is, remains for him to make charges against.

The magnitude of the need can be understood from the nature of current credit card operations. Most individuals today possess one or more credit cards included among those available, such as Visa, Mastercard, American Express, Diner's Club, Carte Blanche, Discovery, etc. Some of these cards include different categories offering different and more extensive privileges and more extensive lines of credit. One of the characteristics of a credit card operation is the fact that keeping the record of expenditures is simply left to the credit card source. Typically, the credit card user does not keep a record of expenditures himself and is thus extremely vulnerable to the temptation of impulse buying and excessive expenditures, not realizing how much he has spent until the time for payment arrives. Thus, with credit cards having high credit limits, the user often finds himself in financial difficulties without having realized that it was occurring. This is particularly significant because the interest rate on moneys owed on the credit card may run as high as 22 percent so that the problem is frequently much more significant than the credit card user ever realized. The credit card business is in fact an enormous business from the standpoint of usage and profits to the credit card sources, with often unrealized vulnerability on the part of the credit card user. The vulnerability of the credit card user increases in proportion to the privileges and benefits and credit limits offered by the credit card source.

At present, the credit card holder does not have available a simple or simplified or convenient means or method to exercise control over, or to monitor, his credit card usage.

A credit card holder could, of course, during the period of a month, for example, actually keep a written record in a book or otherwise as to the amount owing at the beginning of a month, the date and amount of each credit card charge, the amount and date of any payments he has made on the credit card account during the course of a month, and by keeping such a record he could at any time determine the total of charges he has accrued during the month and how much of his credit limit is still available to be obligated. such a process is, of course, inconvenient, cumbersome, unwieldy, and not adapted to the situation since the individual is not likely to undertake the process of keeping such a record at the time that he is making purchases or otherwise incurring obligations on his credit card.

Thus, the need for a simplified method and means or system for monitoring usage of a credit card has not been available in the art. Such a method and means or system is provided by the herein invention, a preferred embodiment of which is described in detail hereinafter.

SUMMARY OF THE INVENTION

A preferred embodiment of the invention is described in detail hereinafter.

In the preferred form of the invention, a recording or monitoring device is provided which is preferably in the form of a card of wallet size that can be carried in a wallet or otherwise along with a credit card and, if desired, can even be attached, preferably removably, to the credit card itself. The device for monitoring, that is, the card, is preferably made erasable so that entries can readily be removed so that the card is available for reuse.

In a preferred form of the invention, the monitoring device is provided with a first series of numbers, preferably in individual spaces in a line or lines, the numbers identifying increments of monetary amounts, such as $10.00. That is, each number identifies a $10.00 increment. Associated with this series of numbers is a space for purposes of an entry identifying the date, for example, the month. The spaces with numbers are adapted for identification simply by way of a checkmark or a circle.

Then below this part of the monitoring device is a column (preferably) of dollar amounts, such as, for example, $10.00; $50.00; $250.00; and $1,000.00 identifying increments of purchase amounts, it being the intention that preferably the credit card account should be monitored not to the exact cent but more approximately in terms of the nearest incremental amount in the column. Associated with these incremental dollar amounts and in relation to each one are a series of spaces adapted for entry of indicia indicating that a charge of that approximate incremental amount has been incurred. It is preferable that these indications can be simply by way of a check mark, for example, to indicate that a charge of $10.00 (approximately) or other incremental amount has been incurred. Thus, the user only has to make a check on the monitoring device rather than having to write in the monetary amount.

A feature is that a removable colored mask is provided to be removably placed over the series of spaces associated with one or more of the larger incremental amounts, for example, to warn the user not to make purchases in those amounts so as to insure that the user stays within a predetermined budget. This is a removable and replaceable stick-on mask, preferably in a bright color, so as to be distinctly noticeable.

Then, also appearing on the monitoring device is another series or line of spaces including one for entry of the month and for entry of incremental amounts of payments that may be made during the monitoring period, such as a month. Then, a further series or line of spaces is provided for entry of either the total amount owing at any particular time or the total amount of credit within the credit limitation that remains to be obligated. Both this other series and the further series may have incremental amounts appearing in the spaces which can be identified by a checkmark rather than writing in the amount.

From the foregoing, those skilled in the art will readily understand the invention and the nature of the objectives of the invention. The invention involves the method, that is, the series of steps employed as described in connection with the monitoring device.

The primary object of the invention is to provide and make available a method for easily and conveniently monitoring a credit card account along with preparation of a monitoring device constituted by a form preferably provided on erasable material and in a convenient size conforming to the credit card itself to enable it to be carried in a wallet along with the credit card.

Another object is to realize a method for monitoring along with the device for monitoring which is readily available and usable at the same time that the user incurs a debit against his credit card account.

Another object is to realize a method as in the foregoing usable along with the monitoring device that readily provides a way of quickly indicating the amount owing at the beginning of a billing period, a means of quickly and readily recording at the time of a purchase the incremental amount of the purchase, and quickly recording the amounts of periodic payments that may be made along with a recording of the total amount owing at any given time. Alternatively to the amount owing at any given time there may be recorded the amount of a credit limit that remains unobligated.

A further object is to provide as a part of the method and the monitoring device a simplified means of advising or warning the user against making larger purchases which may not be advisable within his previously determined budget limitations by way of a removable masking member to cover places for entries identifying purchases in certain predetermined incremental amounts.

DESCRIPTION OF A PREFERRED EMBODIMENT AND MODE OF PRACTICE OF THE INVENTION

Figures 1, 2:
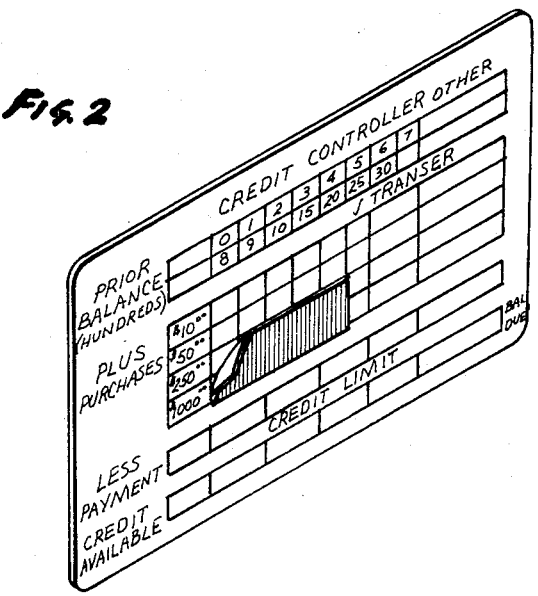
FIG. 1 of the drawings is a view of a preferred exemplary arrangement of the form used to implement executing the steps of the method.
FIG. 2 of the drawings is a view of a modified form of the invention wherein a removable mask is applied to certain parts of the form.

FIG. 1 of the drawings and the previous summary of the invention represent a preferred embodiment of the invention and method of practicing or implementing the method of the invention.

Referring to FIG. 1 of the drawings, the lines of numerals at the top represent incremental monetary amounts, in increments of $10.00 (by way of example) are intended to represent the amount of money owing in the charge account at any particular time, for example, at the beginning of a billing period. For example, the numeral 2 might represent either $20.00 or $200.00 as the user desires, the indication to be made simply by circling the number. The monitoring device or card is made of a preferred plastic material which is readily erasable and will not quickly wear out so that it can be carried in a wallet, for example, without being damaged.

Just below the figures just described is a column of monetary values with a line of spaces opposite each monetary value. The monetary values as shown by way of example are $10.00; $50.00; $250.00; and $1,000.00. In executing the method by way of exemplary illustration, if the user makes a purchase of $10.00 or a purchase of that approximate amount, then the user may simply make a check mark in the first space of the $10.00 line. By making a check mark rather than writing in the amount of the purchase, the monitoring is simplified with to the intent that the final result should be approximate rather than with exactness, the need that the user has primarily being to know not exactly, but approximately, how much he owes and that his remaining balance is within his credit limitation.

FIG. 2 shows a masking strip which is removable and which, as shown, by way of example, is stuck onto the card over the lines of spaces opposite the $250.00 and $1,000.00 incremental purchase figures. The purpose of this removable member is to keep the user advised that it is his intent not to make purchases in those incremental amounts in order to insure that he stays within his predetermined budget limitations. FIG. 2 illustrates that dollar amounts may be written in to identify payments made and amounts of credit still available within the credit limit.

For the foregoing, those skilled in the art will readily understand the nature of the invention from the description of the preferred embodiment and the preferred manner and mode of executing the implementing the method. Also, those skilled in the art will readily understand the manner in which the invention as described achieves all of the objects as set forth in the foregoing.

An example of a manner of utilizing the monitoring device is as follows. The user could simply identify a number among the first group of numbers on the card by encircling it or otherwise to indicate a prior balance of, say, for example, $200.00 or $2000.00. Then, whenever a charge against the credit card is made, the user will make a check in a space after one of the incremental purchase amounts which is closest to the actual amount of the purchase. If a payment has been made, the user can then simply check or encircle one of the payment amounts which is closest to the actual amount of the payment made. Having done this, if for example no payment has been made, the user then simply deducts the amount of the purchase from the credit available at the time and encircles an amount in the credit available line which is closest the the actual amount to indicate the credit available. The user can do these steps each time that a charge is made and/or each time that a payment is made so that the user always has the amount of credit available to him indicated on the bottom line of the monitoring card.

On the other hand, the user can make indications in the spaces opposite the incremental amounts of purchases and then, at a particular time, of course, can totalize the amounts of purchases and can record this in a space; can totalize the amounts of payments and indicate that amount in a space; and then at that time can subtract the total of payments from the total of purchases and, using that figure, can then check a figure in the credit available line to indicate the credit available. Thus, the user can keep up the record so that at the time of each and every transaction, an amount indicating credit available recorded or the steps of totalizing the purchases and payments made to arrive at the available credit limit can be done at any desired interval. Either way, the user has a very simplified facility to enable him to monitor his credit card usage by having a running record available at any and all times to indicate to him what credit he still has available, that is, how much he has spent and/or paid during a period beginning at a given date.

The invention fulfills a need in a very simplified and effective way so that any credit card user can at any given particular time merely refer to the monitoring device so as to know how much he has spend during a monitoring period and how much of his credit limit is still available to him.

The principle and concept of the invention, that is, the method of monitoring, is concrete and distinct. Variations, however, can be made in the monitoring device provided, that is, the particular manner of setting up of the form. For example, to the extent that numbers and/or spaces appear as lines with a space for an indication at the beginning of the line, one could, of course, arrange these numerical indications in columns rather than lines.

The same applies to the column of incremental monetary purchase amounts, that is, the monetary amounts could be arranged in a line with the spaces underneath each monetary amount being in columns.

It is intended that the foregoing disclosure be considered as representative of a preferred form of the invention, and is to be interpreted in an illustrative rather than a limiting sense, the invention to be accorded the full scope of the claims appended hereto.

What is claimed is:

1. A method of monitoring credit card charges and total of credit card charges due for an individual credit card holder, including the steps of preparing a form on a piece of material, the form having on it a series of spaces having numbers identifying monetary increments adapted to be individually marked to identify an individual amount owing at the beginning of a monitoring period; the form having on it a series of indicia identifying monetary amounts of purchases in particular increments including a group of spaces related to each of the individual monetary amounts for identifying purchases at said particular incremental amounts; the form having a further group of spaces having numbers for identifying payments indicating amounts of credit card payments; the form having at least one space for indication of totals of credit card purchases and having spaces for indicating totals of payments and remaining credit available; the further steps including indicating an amount owing in said first series of spaces by marking one of said spaces, in said first series; making indicatiions in the said group of spaces to identify purchases in incremental amounts; making indications in the said further group of spaces to identify incremental payments on the credit charge account; and marking in the said at least one space the total amounts of credit card purchases; making the total of payments in a space for said total whereby the total of credit available can be arithmetically ascertained by inspection of the entries, and marking the total in the space for that total, including the step of preparing the piece of material of substantially credit card size and attaching it to the credit card.

2. A method as in claim 1 including the step of erasing all of the markings that have been made on the form at the end of a predetermined period and repeating the steps during the next period.

3. A method as in claim 1 wherein the monetary amounts of purchases in particular increments are $10.00; $50.00; $250.00; and $1,000.00.

4. A method as in claim 1 wherein the said form has on it printed legends to identify the type of information to be indicated in the said series of spaces, in the said groups of spaces, in the said further group of spaces, and in the said at least one space.

5. A method of monitoring credit card charges and total of credit card charges due for an individual credit card holder, including the steps of preparing a form on a piece of material, the form having on it a series of spaces having numbers identifying monetary increments adapted to be individually marked to identify an amount owing at the beginning of a monitoring period; the form having on it a series of indicia identifying monetary amounts of purchases in particular increments including a group of spaces related to individual amounts for identifying purchases at said particular incremental amounts; the form having a further group of spaces for identifying payments indicating amounts of credit card payments; the form having at least one space for indication of totals of credit card charges owing; the further steps including indicating an amount owing in said first series of spaces by marking one of said spaces, in said first series; making checks in the said group of spaces to identify credit card charges in incremental amounts; making indications in the said further group of spaces to identify incremental payments on the credit charge account; and marking in the said at least one space the total amounts of credit card purchases, and preparing a movable masking member of a size to be able to cover spaces of said group relating to particular incremental monetary amounts in order to warn the user not to make purchases in those incremental monetary amounts.

6. A method of monitoring credit card charges and total of credit card charges due for an individual credit card holder by maintaining a record of accumulated credit charges due or credit balance remaining at any given time including the steps of recording the balance owing at a given time; recording incremental amounts of charges after said given time; totaling the amounts of said charges at any given time after said first-mentioned time; recording amounts of payments made after said given time; and indicating credit available by subtracting the total charges from a credit limit amount, and adding amounts of payments made, providing a recording medium having on it predetermined incremental amounts of charges and related spaces for entering indicia to indicate charges in particular incremental amounts; providing the recording medium with indications of predetermined incremental payment amounts and spaces to indicate incremental payment amounts at any time; and providing the recording medium with indicated available credit amounts and a space to indicate an amount identifying credit available as the credit limit less the total of accumulated charged plus the total of payments made including a removable masking member associated with the recording means and positionable to cover indicating spaces related to predetermined incremental amounts of charges.

* * * * *